(12) United States Patent
Bonnet

(10) Patent No.: US 7,354,247 B2
(45) Date of Patent: Apr. 8, 2008

(54) BLADE FOR A ROTOR OF A WIND ENERGY TURBINE

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 11/259,899

(22) Filed: Oct. 27, 2005

(65) Prior Publication Data

US 2007/0098552 A1    May 3, 2007

(51) Int. Cl.
   *B64C 11/24*    (2006.01)
(52) U.S. Cl. .................. 416/90 R; 416/91; 416/92; 415/905
(58) Field of Classification Search .............. 415/20 R, 415/91, 92, DIG. 4, 905, 914; 416/905, 416/914, 90 R, 91, 92, DIG. 4
   See application file for complete search history.

(56) References Cited

U.S. PATENT DOCUMENTS

| | | | |
|---|---|---|---|
| 2,408,788 A | | 10/1946 | Ludington et al. |
| 3,005,496 A | | 10/1961 | Nichols |
| 3,480,234 A | * | 11/1969 | Cornish .................. 415/914 |
| 3,692,259 A | * | 9/1972 | Yuan ...................... 416/90 A |
| 4,697,769 A | | 10/1987 | Blackwelder et al. |
| 4,976,349 A | | 12/1990 | Adkins |
| 5,297,764 A | * | 3/1994 | Haney .................... 244/199.3 |
| 5,791,601 A | | 8/1998 | Dancila et al. |
| 5,863,180 A | | 1/1999 | Townsend |
| 5,938,404 A | | 8/1999 | Domzalski et al. |
| 6,203,269 B1 | | 3/2001 | Lorber et al. |
| 6,267,331 B1 | * | 7/2001 | Wygnanski et al. ......... 244/204 |
| 6,708,929 B1 | | 3/2004 | Gabriel |
| 6,849,964 B2 | | 2/2005 | Becherucci et al. |
| 6,887,031 B1 | | 5/2005 | Tocher |
| 6,984,110 B2 | | 1/2006 | Jang |
| 2005/0178923 A1 | | 8/2005 | Salz |
| 2006/0006290 A1 | | 1/2006 | Loth |
| 2006/0088421 A1 | | 4/2006 | Shchukin et al. |

FOREIGN PATENT DOCUMENTS

| DE | 101 26 814 A1 | 3/2007 |
|---|---|---|
| WO | WO 00/50778 | 3/2007 |

OTHER PUBLICATIONS

Appl.: General Electricity Company, European Search Report (6 pgs.), Dated: Feb. 13, 2007, European Application No. EP 06 255 505.

* cited by examiner

*Primary Examiner*—Igor Kershteyn
(74) *Attorney, Agent, or Firm*—Armstrong Teasdale LLP

(57) ABSTRACT

A blade for a rotor of a wind energy turbine includes opposite upper and lower faces, opposite leading and trailing edges connecting the upper and lower and at least one air outlet opening arranged on at least one of the upper face, the lower face and the trailing edge for discharging pressurized air into the air around at least one of the upper and lower faces and the leading and trailing edges.

14 Claims, 3 Drawing Sheets

BLADE FOR A ROTOR OF A WIND ENERGY TURBINE

BACKGROUND OF THE INVENTION

This invention relates to a blade for a rotor of a wind energy turbine and, in particular, to a system for influencing the aerodynamic boundary layer around the blade when subjected to an air stream.

To enhance the overall performance of wind energy turbines one approach is to improve the aerodynamic characteristics of the rotor blades. The aerodynamic performance of a rotor blade is limited by undesired generation of vorticities at the root and the tip of the blade and by the location of the transition lines at the upper and lower faces of the blade along which lines the air stream converts from a laminar flow to a turbulent flow which no longer can be used for aerodynamic lift-off effects acting on the blade. In particular root and tip vorticities are disadvantageous not only with respect to the aerodynamic performances but also with respect to the generation of undesired noise and turbulence shadings affecting adjacent wind energy turbines in a wind park.

BRIEF DESCRIPTION OF THE INVENTION

In one aspect, a blade for a rotor of a wind energy turbine is provided. The blade includes opposite upper and lower faces, opposite leading and trailing edges connecting the upper and lower faces, means for generating pressurized air, and at least one air outlet opening in fluid communication with the pressurized air generation means and arranged on at least one of the upper face, the lower face and the trailing edge for discharging the pressurized air into the air around at least one of the upper and lower faces and the leading and trailing edges.

In another aspect, a method is provided for influencing the flow of air around a rotor blade of a wind energy turbine. The method includes discharging pressurized air out of at least one air outlet opening and into a boundary layer of an air stream flowing along the rotor blade.

DETAILED DESCRIPTION OF THE INVENTION

Figure 1:
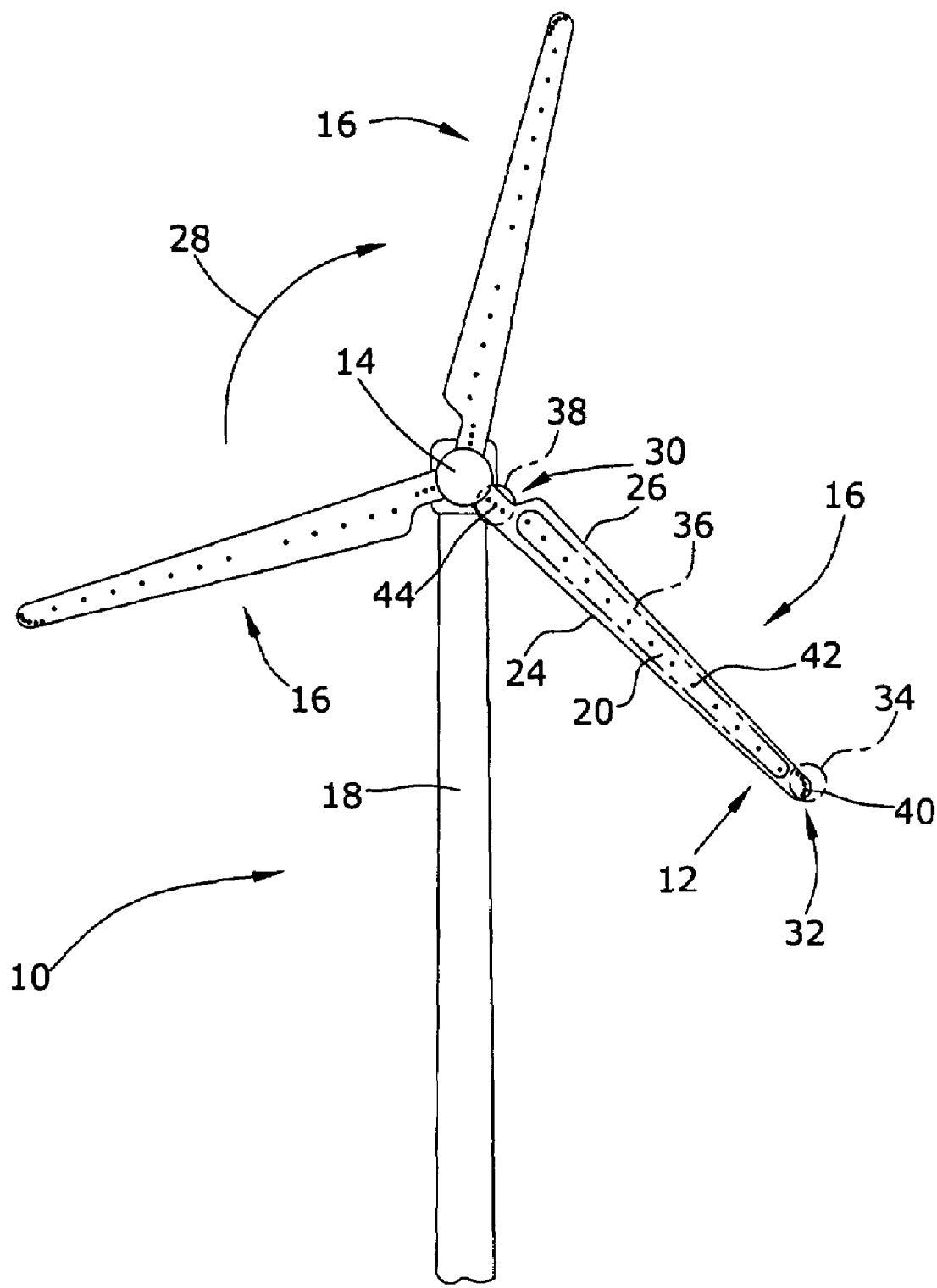
FIG. 1 illustrates an overall view of a wind energy turbine for rotor blades which are provided with air outlet openings for exiting pressurized air jets.

In one embodiment of the invention, at least one outlet opening for discharging pressurized air is arranged in at least one of opposite upper and lower faces and/or the trailing edge of the blade along which the upper and lower faces of the blade are connected, such as along the leading edge of the blade. The pressurized air is generated by means for generating pressurized air. This means can be operable as an active or passive means generating the pressurized air with the aid of a fan or the like or by receiving air of an air stream which the blade is subjected to during operation and releasing this air as pressurized air via the at least one outlet opening. In one embodiment, the means for generating pressurized air can be designed both as passive and active means.

The at least one outlet opening is, in one embodiment, arranged e.g. at the tip of a rotor blade in that face thereof which is subjected to suction of the air flowing along the face. Around the tip there is an aerodynamic shortcut between the suction side and the pressure side around the blade. This short cut together with the rotation of the rotor of the wind energy turbine results in the creation of a three dimensional vorticity flow which in turn reduces the aerodynamic lift acting on the tip of the blade. In that pressurized air is ejected towards the tip, generation of vorticities around the tip are prevented and shifted away from the tip so that the aerodynamic performance of the tip increases. The same is true for the root of a blade of a wind energy turbine which also generates three-dimensional vorticities. In addition, arranging the at least one outlet opening or a plurality of outlet openings on the upper end or faces of the blade while ejecting the pressurized air towards the trailing edge of the blade results in shifting the separation line between laminar and turbulent flow towards the trailing edge which in turn results in a more effective use of the surface of the blade for aerodynamic purposes.

Accordingly, one aspect of the invention relates to the distribution and direction of air jets along the surface of the blade towards the area of the aerodynamic boundary layer around the blade in which areas vorticities and/or turbulences are created so that the percentage of the overall surface size of the blade which can be used for aerodynamic purposes is increased resulting in a more efficient aerodynamic performance of the rotor blade.

In one embodiment of the present invention, the pressurized air generating means comprises at least one air intake opening arranged at the leading edge of the blade or at another location of the blade or rotor. The air intake opening is in fluid connection with the at least one air outlet opening. As an alternative, the pressurized air generating means includes multiple air intake openings arranged at the leading edge and in fluid connection with the at least one air outlet opening or a plurality of air outlet openings of the blade. The fluid connection between the air intake opening and each of the air outlet openings can be realized by one or a plurality of fluid conduits. To improve the air intake performance of the at least one air intake opening, the pressurized air generating means may also include a collector realized e.g. as a narrowing channel which provides a Venturi effect acting on the intaken air for providing pressure thereto.

Further, control means such as flow valves, flaps, flow registers, flow diaphragms, flexible elastic conduit or the like are provided for controlling the specific flow rate and specific relative pressure of pressurized air exiting the air outlet opening or outlet openings. Also with the aid of this control means it is possible to selectively shut individual ones of the air outlet openings which can be advantageous depending on the air stream flowing around the blade.

In another aspect of the present invention, the pressurized air generating means includes a fan for blowing pressurized air out of the at least one air outlet opening. This fan can intake air via an air inlet opening arranged at the leading edge of the blade or at another location of the blade or rotor. In another aspect, the fan is provided as an element of the pressurized air generating means in addition to the passive pressurized air generating means described before. An outlet of the fan can be opened or shut selectively in order to add pressurized air generated by the fan to the flow of pressurized air created from the air inlet opening of the passive pressurized air generating means.

Further, the pressurized air exits at least through one air outlet opening, which can feature at least one termination or at least one nozzle-like shape in order to introduce specific air outlet opening jet expansion shape(s) or a specific amount of jet vorticity(ies) in specific vorticity direction(s).

As described above, the present invention is applicable to wind energy turbines from both the action and reaction type i.e. to wind energy turbines having a horizontal or vertical rotation axis. More specifically, FIG. 1 illustrates the overall construction of a wind energy turbine 10 provided with rotor blades designed according to one embodiment. The wind energy turbine 10 includes a rotor 12 having a hub 14 from which three rotor blades 16 extend radially. The number of rotor blades, in alternative embodiments, can be more or less than three. Rotor 12 is arranged on a nacelle (not shown) of wind energy turbine 10 which nacelle is supported by a tower 18. The nacelle is capable of rotating around a vertical axis while rotor 12 rotates around a horizontal axis. Accordingly, wind energy turbine 10 of FIG. 1 is of the action type. However, the invention is also applicable for rotors of a reaction type wind energy turbine.

Each rotor blade 10 includes an upper face 20 and an opposite lower face 22 (not shown in FIG. 1 but depicted in FIGS. 3 to 5), a leading edge 24 and an opposite trailing edge 26 with respect to the direction of rotation 28 of rotor 12. Each rotor blade 16 further comprises a root 30 by which blade 16 is connected to hub 14, and a tip 32 at the radial end of blade 16. As can be seen from FIG. 1, diverse groups 34, 36, and 38 of exit openings 40, 42 and 44 are arranged in upper surface 20 of each blade 16. In an alternative embodiment, blades 16 include more or less than three groups and each group includes more or less than the number of openings depicted in FIG. In an further embodiment, groups 34, 36, and 38 and openings 40, 42, and 44 are arranged differently than depicted in FIG. 1.

Figure 2:
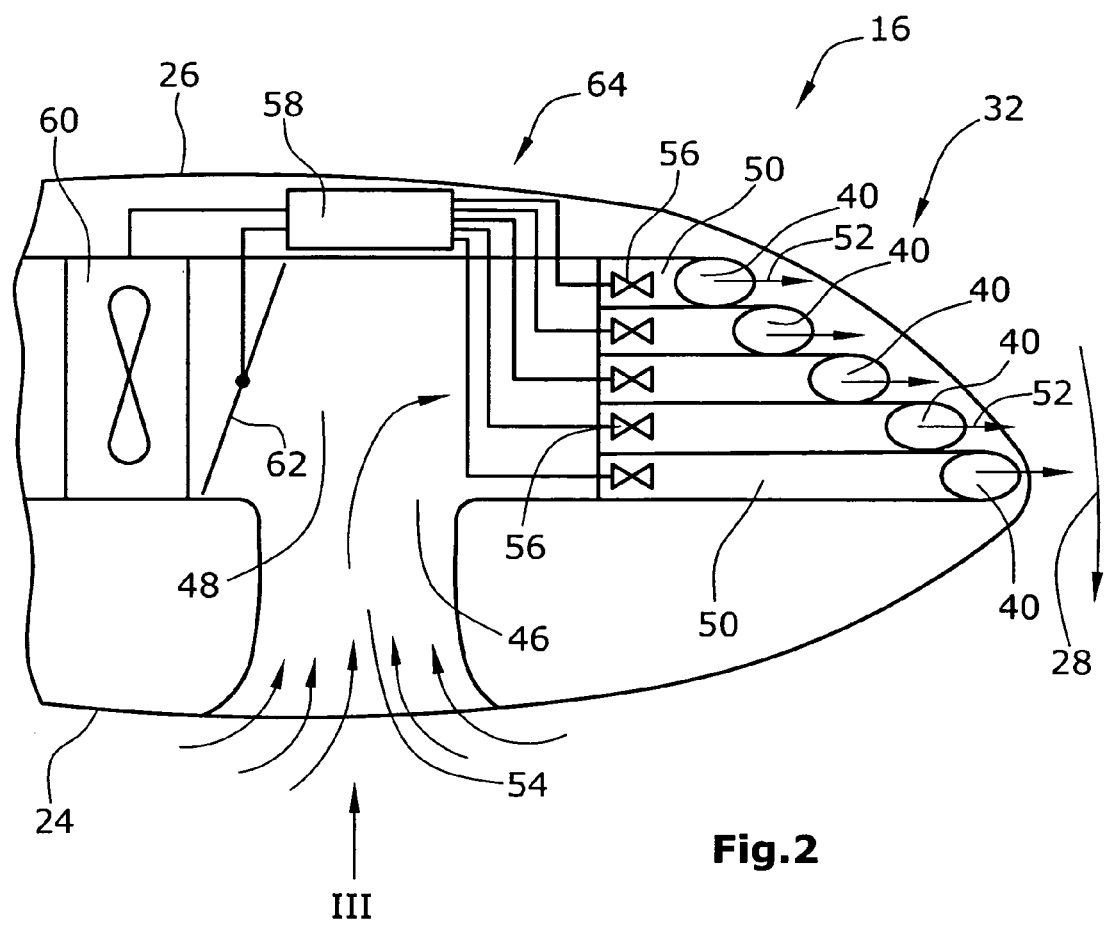
FIG. 2 illustrates the tip of a rotor blade on a larger scale for depicting the basic constructional features of the pressurized air generating means according to one embodiment of the invention.
Figure 3:
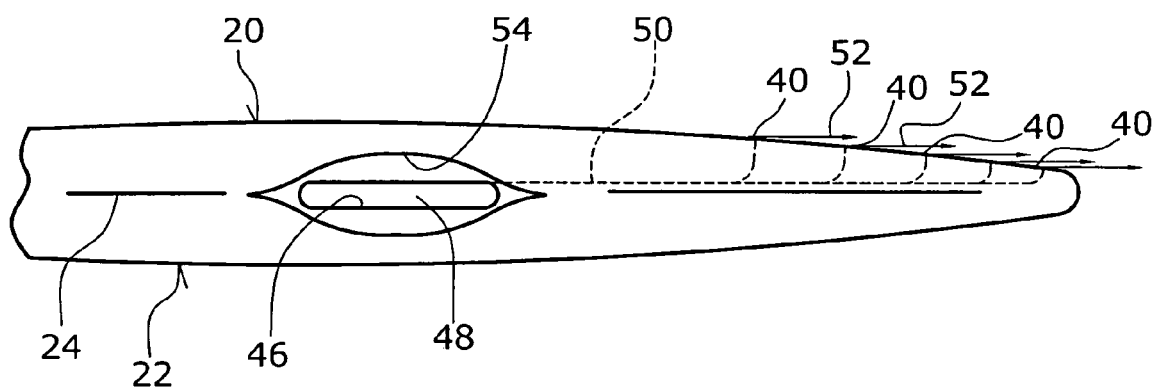
FIG. 3 illustrates a view in the direction of the leading edge of the rotor blade at its tip.

The arrangement of air outlet openings 40 of group 34 at tip 32 of blade 16 is shown in more detail in FIGS. 2 and 3. As can be seen from FIG. 3, at tip 32 of blade 16 there is provided an air intake opening 46 arranged in leading edge 24 of blade 16. However, it is to be noted that this air intake opening 46 can also be arranged within a different portion of leading edge 24. Air intake opening 46 is in fluid communication with each of air outlet openings 40 which in FIG. 2 is shown by channel 48 from which individual fluid conduits extend which lead to individual air outlet openings 40. As an alternative, all air outlet openings 40 can be arranged within one common air channel. As can be seen in particular in FIG. 3, air outlet openings 40 are directed towards tip 32 of blade 16. During operation of rotor 12, air enters tip 32 through air intake opening 46 and is guided through fluid conduits 50 and out air outlet openings 40 as shown by arrows 52 of FIG. 3. The individual air streams 52 prevent the creation of a vortex around tip 32 of blade 16 so that the air stream along upper and lower faces 20 and 22 around tip 32 is more laminar and, accordingly, can be effectively used for the aerodynamic lift.

In one embodiment, the air intake performance and pressurized generation of the air taken in through the openings is improved by arranging a Venturi collector 54 at air intake opening 46. By this narrowing channel construction the air is forced into channel 48, providing improved pressurization of the air.

In one embodiment, individual air outlet openings are selectively shut and opened. Accordingly, as shown in FIG. 2, several valves 56 are arranged associated to each of air outlet openings 40. Valves 56 are controlled, in one embodiment, by means of a control unit 58.

In addition, rotor blade 16 includes, in one embodiment, a fan 60 arranged at one of within rotor blade 16, within hub 14, or at any other location within or outside wind energy turbine 10 for generating an active air stream directed towards air outlet openings 40. Fan 60, as well as a closing or opening flap 62 is controlled by a control unit which in the embodiment of FIG. 2 also controls valves 56. Of course it is to be noted that the pressurized air generating means 64 provided by air intake opening 56 and air outlet openings 40 together with channel 48 and fluid conduits 50 are also operative without fan 60.

The internal fluid communication system for discharging pressurized air out of the air outlet openings 40 as shown in FIGS. 2 and 3 relates to a combination of active and passive systems. A fluid communication system of the passive type comprises a fluid communication between intake opening 46 and outlet openings 40 without a fan or the like while an active type fluid communication system includes a motorized fan in fluid communication with air intake opening 46 and outlet openings 40. Irrespective of the active or passive type fluid communication system, outlet openings 40 are designed, in one embodiment, as nozzles to eject the pressurized air as air jets.

Figure 4:
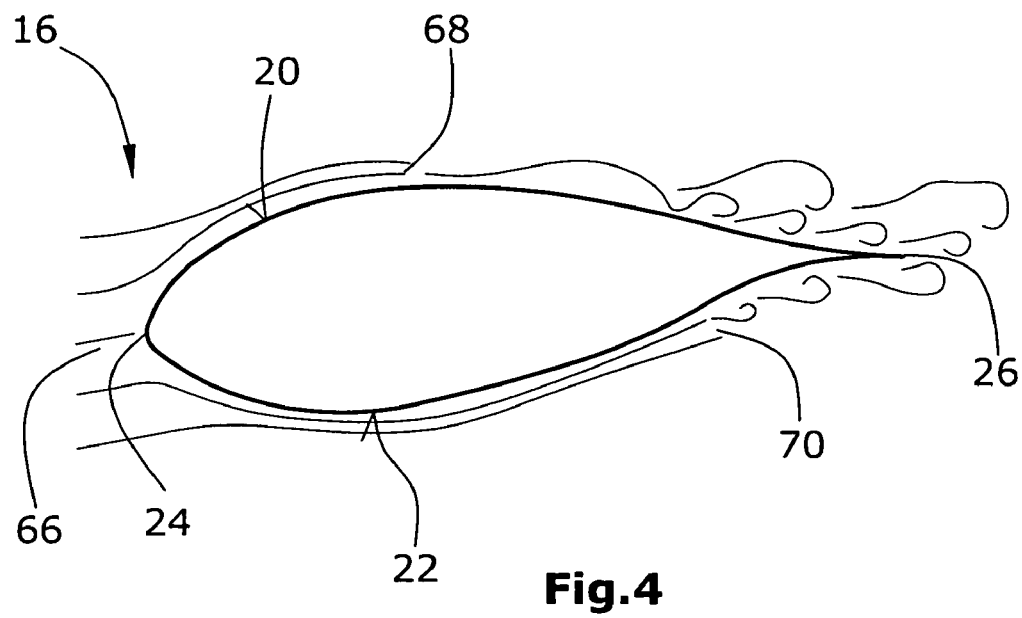
FIG. 4 illustrates a cross sectional view of a rotor blade of a wind energy turbine without the provision of air outlet openings as suggested according to the invention.
Figure 5:
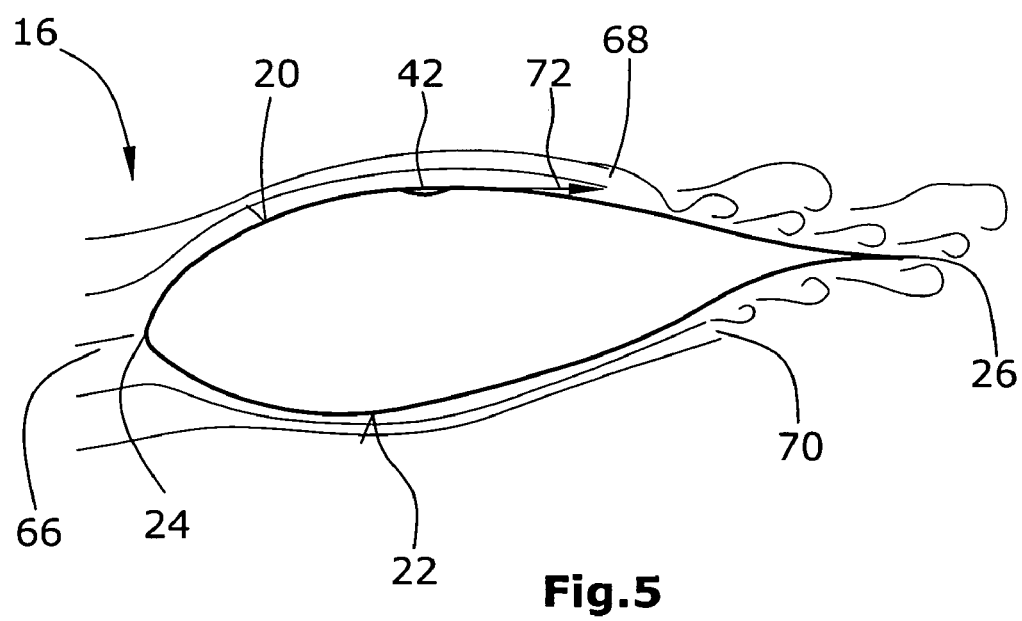
FIG. 5 illustrates the cross sectional view of a rotor blade of a wind energy turbine comprising air outlet openings for shifting the transition from laminar to turbulent flow towards the leading edge of the blade.

By means of the pressurized air jets 52 ejected from the air outlet openings 40 along upper face 20 of blade 16 and perpendicular to the air stream to which rotor blade 16 is subjected reduces and/or prevents generation of vorticities at tip 32 of rotor blade 16. By means of air outlet openings 42 of FIG. 1 which are arranged in upper face 20 closer to trailing edge 26 than to leading edge 24 it is possible to shift the transition from laminar to turbulent flow along blade 16 towards its trailing edge 26. This phenomenon is depicted in FIGS. 4 and 5. The normal situation without air outlet openings 46 is shown in FIG. 4. Air stream 66 flows as a laminar flow along upper face 20 and lower face 22 up to transitions 68, 70 from which the laminar flow becomes turbulent. FIG. 5 shows that with the aid of the air outlet openings 42, pressurized air jets 72 are ejected along upper face 20 and towards trailing edge 28 so that transition 68 at upper face 20 is shifted backwards towards trailing edge 26 resulting in an increase of the percentage of the surface area aerodynamically used for lift off.

The air which is ejected through air outlet openings 42 can be taken in by means of additional air intake openings (not shown) arranged in leading edge 24 of the blade 16 and/or by air generated actively by means of fan 60 or another fan provided at wind energy turbine 10.

Air outlet openings 44 at root 30 of blade 16 are operative similar to the shift of the transition as shown in FIGS. 4 and 5 by the provision of air outlet openings 42.

While the invention has been described in terms of various specific embodiments, those skilled in the art will recognize that the invention can be practiced with modification within the spirit and scope of the claims.

What is claimed is:

1. A blade for a rotor of a wind energy turbine, said blade comprising:
   opposite upper and lower faces;
   opposite leading and trailing edges connecting said upper and lower faces;
   means for generating pressurized air; and
   at least one air outlet opening in fluid communication with said pressurized air generation means and arranged on at least one of said upper face, said lower face and said trailing edge for discharging the pressurized air into the air around at least one of said upper and lower faces and said leading and trailing edges;
   wherein said means for generating pressurized air comprises at least one air intake opening defined at said leading edge radially inwardly from a tip of said blade and being in fluid communication with said at least one air outlet opening.

2. The blade according to claim 1 further comprising a root and a tip arranged at ends of said leading and trailing edges, said at least one air outlet opening arranged on at least one of said upper and lower faces at least one of said root and said tip.

3. The blade according to claim 1 wherein multiple air outlet opening are provided, each said outlet being in fluid communication with said least one air intake opening by means of at least one fluid conduit.

4. The blade according to claim 3 wherein said pressurized air generating means further comprises a collector arranged at said at least one air intake opening.

5. The blade according to claim 1 wherein said pressurized air generating means further comprises a collector arranged at said at least one air intake opening.

6. The blade according to claim 3 wherein said pressurized air generating means further comprises a fan for blowing pressurized air out of said at least one air outlet opening.

7. The blade according to claim 6 wherein an outlet of said fan is in fluid communication with said at least one air outlet opening and wherein an inlet opening of said fan is provided for intaking air by said fan.

8. The blade according to claim 7 wherein said inlet opening for said fan is in fluid communication with at least one of said at least one air intake opening of the pressurized air generation means.

9. A method for influencing the flow of air around a rotor blade of a wind energy turbine, said method comprising discharging pressurized air out of at least one air outlet opening and into a boundary layer of an air stream flowing along the rotor blade wherein the pressurized air is generated from air flowing into an air intake opening that is defined at a leading edge radially inwardly from a tip of said blade and being in fluid communication with said at least one air outlet opening.

10. The method according to claim 9 wherein the pressurized air is discharged substantially parallel to a surface of the rotor blade.

11. The method according to claim 10 wherein the pressurized air is generated by a fan.

12. The method according to claim 11 wherein the pressurized air is generated by a fan.

13. The method according to claim 9 wherein the at least one air outlet opening is arranged at a tip of the blade directed towards the tip so as to be discharged in a direction perpendicular to the direction of the air stream around the tip of the blade.

14. The method according to claim 9 wherein the at least one air outlet opening is configured to discharge pressurized air in a direction of the air stream flowing over the air outlet opening.

* * * * *